(12) United States Patent
Dwyer et al.

(10) Patent No.: US 7,203,288 B1
(45) Date of Patent: Apr. 10, 2007

(54) INTELLIGENT ROUTING OF VOICE FILES IN VOICE DATA MANAGEMENT SYSTEM

(75) Inventors: John J. Dwyer, Stratford, CT (US); David K. Godin, Wilton, CT (US); Stephen Rothschild, Ridgefield, CT (US); John J. Pawlowski, Shelton, CT (US)

(73) Assignee: Dictaphone Corporation, Stratford, CT (US)

( * ) Notice: Subject to any disclaimer, the term of this patent is extended or adjusted under 35 U.S.C. 154(b) by 0 days.

(21) Appl. No.: 09/190,536

(22) Filed: Nov. 12, 1998

Related U.S. Application Data

(60) Provisional application No. 60/066,748, filed on Nov. 21, 1997.

(51) Int. Cl.
*H04M 1/64* (2006.01)
(52) U.S. Cl. .............................. 379/88.23; 379/88.19; 379/88.22; 379/75; 455/412.1; 455/413; 704/225; 704/235; 704/270
(58) Field of Classification Search ................ 455/412, 455/412.1, 413, 517; 704/235, 270, 500, 704/225; 340/825.52; 369/25; 379/88.19, 379/67.1, 68, 75, 73, 80, 83, 88.01, 88.02, 379/88.03, 88.04, 88.22, 88.23, 88.17, 875; 364/900

See application file for complete search history.

(56) References Cited

U.S. PATENT DOCUMENTS

| | | | |
|---|---|---|---|
| 4,319,337 A | * | 3/1982 | Sander et al. ................ 364/900 |
| 4,833,625 A | | 5/1989 | Fisher et al. |
| 4,837,830 A | | 6/1989 | Wrench, Jr. et al. |
| 5,033,077 A | * | 7/1991 | Bergeron et al. ........... 379/396 |
| 5,146,439 A | | 9/1992 | Jachmann et al. |
| 5,163,085 A | | 11/1992 | Sweet et al. |
| 5,216,744 A | | 6/1993 | Alleyne et al. |
| 5,265,075 A | | 11/1993 | Bergeron et al. |
| 5,294,229 A | | 3/1994 | Hartzell et al. |
| 5,398,220 A | * | 3/1995 | Barker ........................ 379/75 |
| 5,423,034 A | | 6/1995 | Cohen-Levy et al. |
| 5,444,768 A | | 8/1995 | Lemaire et al. |
| 5,469,353 A | | 11/1995 | Pinsky et al. |
| 5,477,511 A | | 12/1995 | Englehardt |
| 5,481,645 A | | 1/1996 | Bertino et al. |

(Continued)

OTHER PUBLICATIONS

Lisa J. Stifelman, "VoiceNotes: An Application for a Voice-Controlled Hand-Held Computer," MIT Master's Thesis (Jun, 1992).

(Continued)

*Primary Examiner*—Gerald Gauthier
(74) *Attorney, Agent, or Firm*—Kelley Drye & Warren LLP

(57) ABSTRACT

A portable digital voice recorder is interfaced for data communication with a personal computer. The personal computer is connected by a data communication network with other devices such as other personal computers, a central dictation system, and/or a voice mail system. Voice data files previously generated by dictating information into the portable recorder are stored in the portable recorder and then uploaded to the personal computer. The voice data files include header data associated with the voice data files. The personal computer reads the header data and automatically forwards the voice data file to one or more of the other devices on the basis of information contained in the header data.

25 Claims, 10 Drawing Sheets

U.S. PATENT DOCUMENTS

| | | | |
|---|---|---|---|
| 5,491,774 A | 2/1996 | Norris et al. | |
| 5,548,566 A | 8/1996 | Barker | |
| 5,568,538 A * | 10/1996 | Tamir et al. | 379/447 |
| 5,615,112 A | 3/1997 | Liu Sheng et al. | |
| 5,625,678 A | 4/1997 | Blomfield-Brown et al. | |
| 5,729,734 A | 3/1998 | Parker et al. | |
| 5,742,736 A | 4/1998 | Haddock | |
| 5,774,841 A * | 6/1998 | Salazar et al. | 704/225 |
| 5,799,280 A | 8/1998 | Degen et al. | |
| 5,812,882 A * | 9/1998 | Raji et al. | 379/75 |
| 5,818,800 A * | 10/1998 | Barker | 369/29.01 |
| 5,839,108 A | 11/1998 | Daberko et al. | |
| 5,898,916 A * | 4/1999 | Breslawsky | 455/412 |
| 5,903,871 A * | 5/1999 | Terui et al. | 704/270 |
| 5,913,061 A | 6/1999 | Gupta et al. | |
| 5,982,857 A * | 11/1999 | Brady | 379/88.19 |
| 5,986,568 A * | 11/1999 | Suzuki et al. | 340/825.52 |
| 6,006,263 A | 12/1999 | Horwitz et al. | |
| 6,011,803 A | 1/2000 | Bicknell et al. | |
| 6,014,440 A | 1/2000 | Melkild et al. | |
| 6,038,199 A | 3/2000 | Pawlowski et al. | |
| 6,075,844 A * | 6/2000 | Goldberg et al. | 379/88.17 |
| 6,094,688 A | 7/2000 | Mellen-Garnett et al. | |
| 6,122,614 A * | 9/2000 | Kahn et al. | 704/235 |
| 6,175,822 B1 | 1/2001 | Jones | |
| 6,263,330 B1 | 7/2001 | Bessette | |
| 6,282,154 B1 * | 8/2001 | Webb | 369/25 |
| 6,308,158 B1 | 10/2001 | Kuhnen et al. | |
| 6,317,754 B1 | 11/2001 | Peng et al. | |
| 6,321,129 B1 | 11/2001 | D'Agosto, III | |
| 6,356,754 B1 * | 3/2002 | Onozawa et al. | 379/67.1 |
| 6,421,667 B1 | 7/2002 | Codd et al. | |
| 6,434,569 B1 | 8/2002 | Toshimitsu et al. | |
| 6,493,672 B2 | 12/2002 | D'Agosto, III et al. | |
| 6,494,831 B1 | 12/2002 | Koritzinsky | |
| 6,571,211 B1 | 5/2003 | Dwyer et al. | |
| 6,574,629 B1 | 6/2003 | Cooke Jr. et al. | |
| 6,665,248 B1 | 12/2003 | Onishi et al. | |
| 6,671,567 B1 | 12/2003 | Dwyer et al. | |

OTHER PUBLICATIONS

COSIC, "An Open Medical Imaging Workstation Architecture for Platform-Independent 3-D Medical Image Processing and Visualization," IEEE, Jan. 1997, pp. 279-283.

U.S. Appl. No. 09/415,617, filed Oct. 11, 1999, Cyr, et al.

TechEncyclopedia, Definition of "Download," TechWeb: The Business Technology Network, 2002, 2 pages.

Uploading-A Whatis Definition, Tech Target 2002, 2 pages.

* cited by examiner

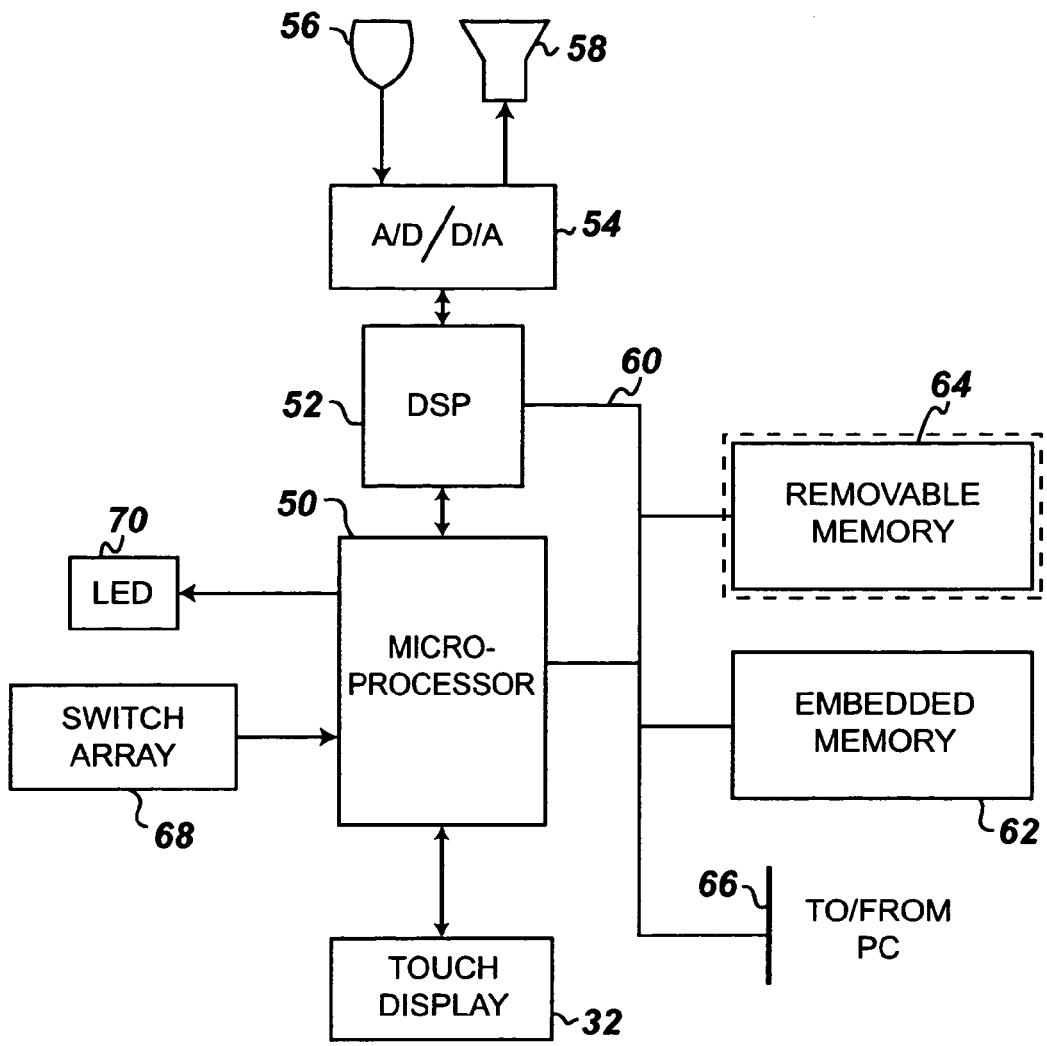
FIG. 3  DIGITAL PORTABLE RECORDER
(BLOCK DIAGRAM)

INTELLIGENT ROUTING OF VOICE FILES IN VOICE DATA MANAGEMENT SYSTEM

CROSS-REFERENCE TO RELATED APPLICATION

This application claims benefit of provisional patent application Ser. No. 60/066,748, filed Nov. 21, 1997.

BACKGROUND OF THE INVENTION

Pocket-sized voice recorders are widely used as a convenient way to take notes, store information and create documents in audio form. Among other applications, the recorded information may be transcribed to present the information in written form.

In recent years, compact audio recorders have been proposed in which the audio information is stored as digital data in a solid state memory. In some cases, a removable memory card is used as the storage medium.

Portable digital audio recorders that are currently available in the market suffer from significant limitations in terms of flexibility and ease of use. Among issues that have not been satisfactorily addressed by the prior art are how voice data files generated in a portable digital audio recorder are to be imported into and managed by networks of personal computers and other information technology systems that are often used in offices and large business establishments.

OBJECTS AND SUMMARY OF THE INVENTION

It is an object of the invention to provide a voice data management system which includes a portable digital audio recorder that is selectively interfaceable to a personal computer.

It is a further object of the invention to facilitate management of voice data files uploaded from the portable recorder to the personal computer.

According to an aspect of the invention, there is provided a voice data management system, which includes a portable digital audio recorder having a memory for storing a plurality of voice data files with header data stored in the memory in association with each of the voice data files, a personal computer, connection circuitry for transferring the voice data files and the corresponding header data from the portable recorder to the personal computer, a plurality of information processing devices other than the portable recorder and the personal computer, and a network for interconnecting the personal computer with the plurality of information processing devices and permitting transmission of data from the personal computer to selected ones of the plurality of data processing devices, wherein the personal computer reads the header data transferred to the personal computer, and on the basis of the header data, the personal computer selects one of the plurality of information processing devices to receive the voice data file corresponding to the header data and transmits the corresponding voice data file to the selected data processing device.

The selection of the information processing device to which the personal computer transfers the voice data file may be based on header data which identifies one or more of the author of the voice data file, the portable digital audio recorder unit used to create the voice data file, the intended recipient of the voice data file and/or the subject matter of the voice data file. The information processing devices connected via the network to the personal computer may include one or more personal computers, a central dictation system and/or a voice mail system. It will be recognized that selecting one of said other information processing devices is equivalent to determining whether the voice data file should be transferred to the selected device.

According to another aspect of the invention, there is provided a method of operating a voice data management system, including the steps of dictating voice information into a portable audio recorder, storing the voice information in the portable audio recorder in the form of digital voice data, dictating recipient information into the portable audio recorder, applying a speech recognition algorithm to the recipient information to generate recipient data, transferring the digital voice data from the recorder to a personal computer, selecting a data processing device from among a plurality of data processing devices connected to the personal computer on the basis of the recipient data, and transferring the digital voice data from the personal computer to the selected data processing device. The speech recognition algorithm may be applied either at the first personal computer or in the portable recorder itself. Preferably the portable recorder includes a dedicated switch or another facility for allowing the user of the recorder to indicate that voice information currently being inputted into the recorder is to be designated as recipient information.

In a voice data management system provided in accordance with the invention, the system operates to route voice data files originally generated in a portable recorder from a personal computer to other devices, including other personal computers, either without decision-making and action on the part of the user, or in a manner that minimizes the effort required on the part of the user.

Other objects, features and advantages of the invention will become apparent from the subsequent more detailed description of preferred embodiments.

BRIEF DESCRIPTION OF THE DRAWINGS

FIG. 3 is a block diagram representation of electrical and electronic components of the portable recorder of FIG. 2.

DESCRIPTION OF PREFERRED EMBODIMENTS

Figure 1:
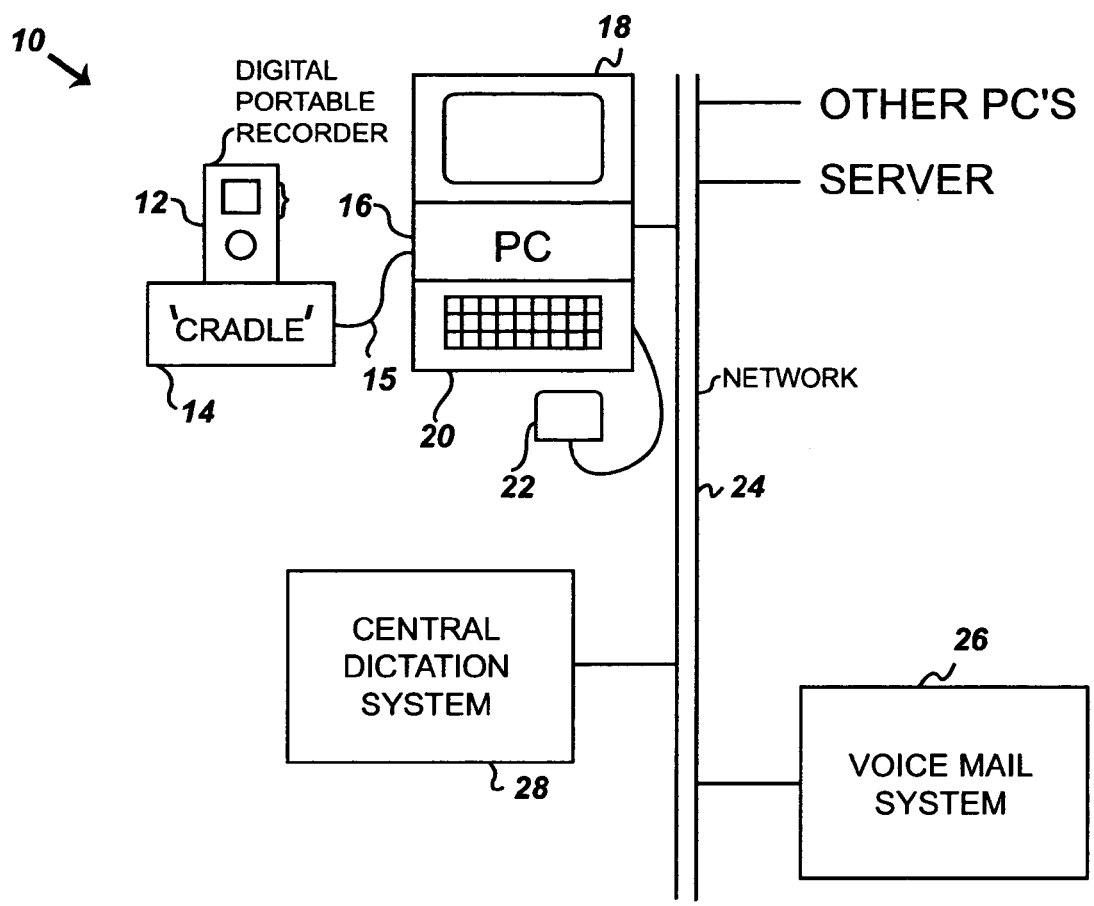
FIG. 1 is a block diagram of a voice data management system which is provided in accordance with the present invention.

An embodiment of the invention will now be described, initially with reference to FIG. 1. In FIG. 1, reference numeral 10 generally indicates a voice data management system provided in accordance with the invention. The system 10 includes a portable digital voice recorder 12. The recorder 12 is shown resting on a docking station or "cradle" 14. A cable 15 connects the cradle 14 to a personal computer 16. The cradle forms part of a signal path which permits exchanging of digital data between the portable recorder 12 and the PC 16.

The PC 16 is preferably of conventional construction, including a display 18, keyboard 20 and mouse 22. Among other functions, the PC 16 receives and stores voice data files transferred to the PC 16 from the recorder 12. Details of software which controls the PC 16 in connection with its interactions with the recorder 12 are set forth in co-pending patent application Ser. No. 09/190,196, filed Nov. 12, 1998, entitled "VOICE FILE MANAGEMENT IN PORTABLE DIGITAL AUDIO RECORDER," which has common inventors and a common assignee with the present application.

Also shown in FIG. 1 is a local area network (LAN) 24 which provides for data communication among the PC 16 and other system components, including other personal computers, a network server device, a voice mail system 26 and a central dictation system 28. Like the LAN 24, the other system components just enumerated may all be conventional items. The PC 16 is preferably operable to download to the recorder 12 voice mail messages transferred to the PC 16 from the voice mail system 26 via LAN 24. The PC also preferably operates to transfer to the voice mail system 26 voice mail messages created in the recorder 12 and uploaded from the recorder 12 to the PC 16. Voice data files generated in the recorder 12 and uploaded to the PC 16 may also be transferred from the PC 16 to other system components, including other PC's connected to the LAN 24, or to the dictation system 28.

Overview of Portable Recorder Hardware

Figure 2:
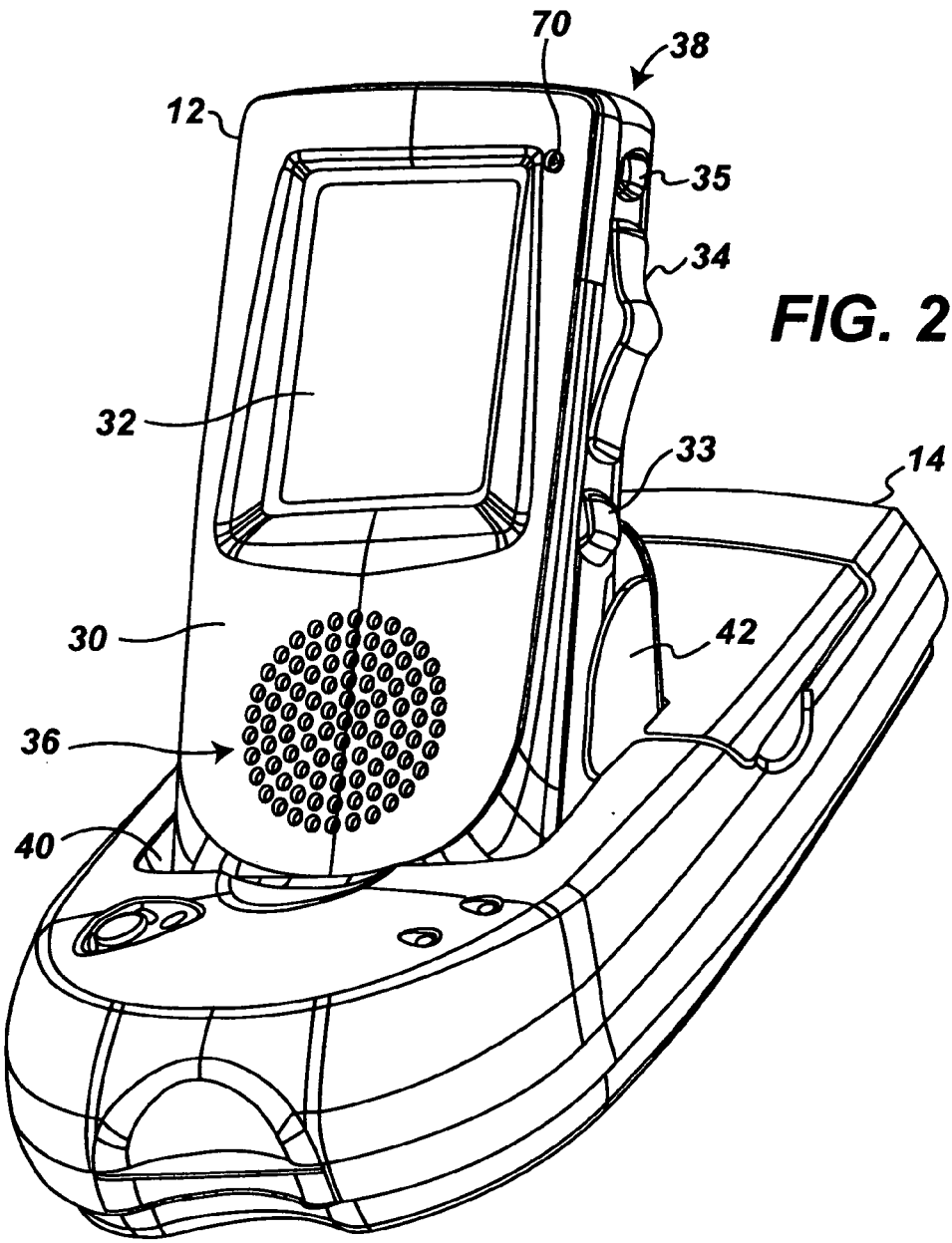
FIG. 2 is a perspective view of a portable digital voice recorder and a docking station which are part of the system of FIG. 1.

FIG. 2 is a perspective view showing some details of the portable recorder 12 and cradle 14. As seen in FIG. 2, the portable recorder 12 includes a housing 30, on which are mounted a display screen 32 and a slide switch 34. The recorder 12 may be like recorders disclosed in co-pending application Ser. No. 09/177,028, filed Oct. 22, 1998. The recorder 12 is preferably a very compact item, such that the housing 30 is shaped and sized to fit in the user's hand. The display screen 32 is preferably a touch screen which allows the user to interact with the recorder 12 in a manner similar to that employed in so-called "personal digital assistants". A stylus (not shown) may be provided with the recorder to aid in inputting user selections via the touch screen.

The slide switch 34 is used to control conventional functions provided in a portable voice recorder, such as "record", "play", "rewind", and "stop". The functioning of the slide switch preferably emulates the user interface provided by high-end tape-based dictation units, so that users familiar with conventional dictation practices can easily adapt to using the digital recorder described herein. Push buttons 33, 35 may provide additional functions, such as "fast forward" or "cue". Alternatively, one of the buttons may control backlighting for the screen 32. Additional push buttons may be provided in place of the slide switch.

Other salient features of the recorder 12 include a grille region 36 in the housing, provided to cover a speaker which is built into the recorder. The recorder 12 also includes a microphone which is not shown in FIG. 2, but is preferably installed at a corner 38 of the housing near the slide switch 34.

The recorder 12 rests in a recess 40 of the cradle 14 and reclines against a lid 42 for the recess 40. Provided within the recess 40 of the cradle 14, and not visible in FIG. 2, is a parallel data connection which mates with a corresponding connection in the base of the recorder housing 30. The recorder parallel connection also is not visible in the drawing.

Electric and electronic components of the recorder 12 are illustrated in block diagram form in FIG. 3. It is to be understood that the components shown in FIG. 3 are mounted within or on the recorder housing 30 (FIG. 2).

Continuing to refer to FIG. 3, a microprocessor or microcontroller 50 is mounted within the recorder and controls operations of the recorder. The microprocessor 50 is connected to a digital signal processing circuit 52 and exchanges command and data messages with the DSP 52. The DSP 52 is, in turn, connected to a circuit 54 which performs analog-to-digital and digital-to-analog signal conversion functions. The recorder also has a built-in microphone 56 and speaker 58 which are connected to the A/D and D/A circuit 54. (To simplify the drawing, signal conditioning circuits such as filters and amplifiers are not shown.) A multi-bit signal bus 60 interconnects the microprocessor 50 with the DSP 52 as well as an embedded memory device 62, a removable memory card 64, and the above-mentioned parallel data port 66 by which data may be exchanged with the personal computer. The removable memory card 64 may be used primarily for storing voice files and associated header data (to be described below), and the embedded memory 62 may be used primarily for program and working memory. However, these roles may be shared or reversed.

The microprocessor 50 is also interconnected with the above-mentioned touch screen 32, by which the microprocessor 50 provides information to the user of the recorder, and through which the user inputs information to the microprocessor 50. Also providing input to the microprocessor 50 is a switch array 68 which is actuatable by the user by means of the above-mentioned slide switch 34 (FIG. 2). Illustrated in both FIGS. 2 and 3 is a light emitting diode 70 which is selectively illuminated by the microprocessor 50 to indicate when voice recording is taking place.

Figure 4A:
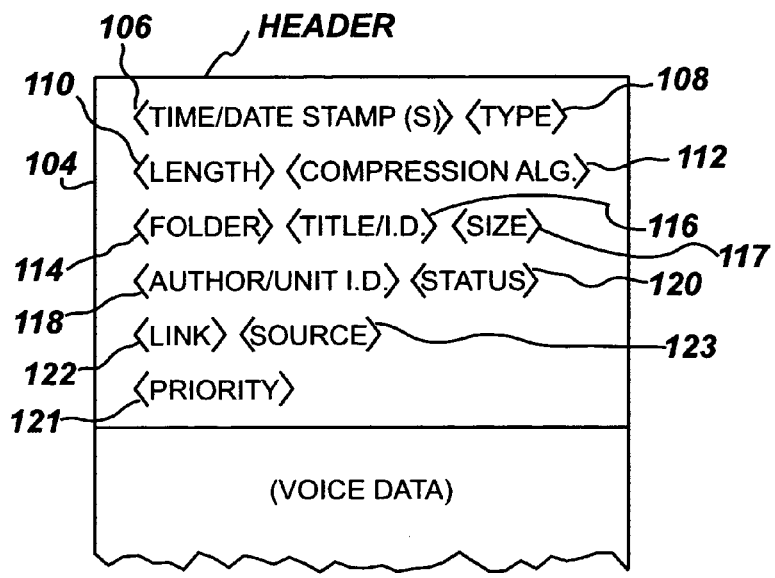
FIG. 4A illustrates a voice file format, including header data, for voice data files stored in the portable recorder.

FIG. 4A schematically illustrates a format that may be employed for each of the voice data files referred to above. Recorded with, or otherwise associated with, each voice file is header data 104, which preferably includes one or more time and date stamps 106 (corresponding to a time or times at which the voice file was originally recorded or additional voice information was added to the file); data 108 indicating the type of the file (in this case, the type being "voice"; the type data may further specify that the file is an outgoing voice mail message); data 110 which indicates the length (in minutes and seconds) of the corresponding voice file; data 112 which indicates the compression algorithm employed with respect to the voice file; data 114 which indicates the "folder" with which the corresponding voice file is associated; title or other identifying data 116, which indicates a title or other name used to identify the corresponding voice file; "size" data 117 which indicates the number of data words making up the voice file; data 118 which identifies the individual user who created the voice file and/or the particular portable recorder which was used to create the voice file; "status" data 120, which indicates, for example, whether the user has designated the file as "complete" and ready for forwarding to a transcriptionist; data 122 which may be provided to indicate links between the present voice data file and other files, including other voice data files; "source" data 123 which indicates whether the associated voice file was generated internally via the recorder microphone or downloaded from an external source, such as a voice mail system; and a "priority" flag 121, which indicates, in the case of a dictation file, whether it is to be processed on a priority basis after uploading to the PC 16 and/or transfer to central dictation system 28.

According to an alternative preferred embodiment of the invention, the user of the recorder is permitted to define up to six fields of header data which are suitable to the user's particular application. For example, if the recorder is to be used in a medical practice, the six customizable fields may correspond to such items as work type, department, procedure number, location number, medical record number, patient's date of birth. Moreover, the user may be permitted to select from among a number of different header data formats so that the header format used is one which is most appropriate to the nature or purpose of the respective voice data file.

It should be understood that the header data format shown in FIG. 4A is only an example of many possible header data formats. The order of the data may be changed, additional header data may be provided, and many of the types of data shown in FIG. 4A may be omitted. In connection with certain aspects of the invention, elements of the header data such as author/recorder unit are critical to the invention. However, other aspects of the invention may be carried out without reference to any element of the header data, in which case the header data in its entirety may be omitted from the voice file format.

Figure 5:
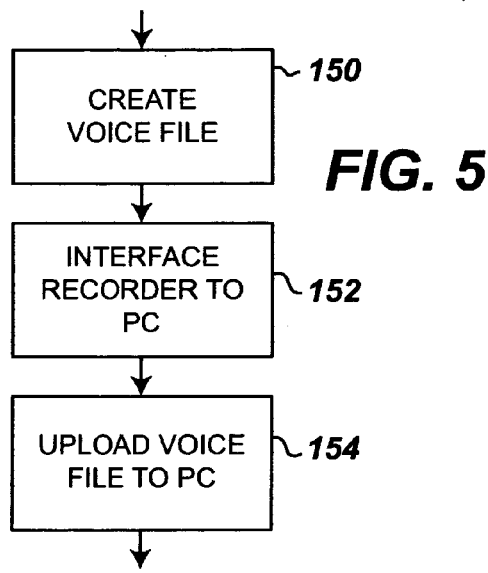
FIG. 5 is a flow chart which illustrates operation of the portable recorder in connection with creation and uploading of voice data files.

FIG. 5 illustrates in the form of a high-level flow chart a process whereby a voice file is created using the recorder 12 and then uploaded to the PC 16. Initially in FIG. 5 is step 150, which represents creating a voice data file using the recorder 12. At step 150, the user of the recorder creates a voice data file by speaking into the microphone 56 while positioning the slide switch 34 so as to place the recorder in a recording mode. Alternatively, the recording mode of the recorder may be actuated through a user interface provided via touch screen 32. The elements of header data located in FIG. 4A may be generated automatically by the recorder and/or may reflect data entered by the user via the touch screen 32.

Following step 150 is step 152. At step 152 the recorder 32 is placed in the cradle 14, in the manner illustrated in FIG. 2, so that a data communication interface is formed between the recorder 12 and the PC 16 (FIG. 1). By means of the data communication interface, the voice data file generated at step 150, including its header data, is uploaded to the PC 16 (step 154).

Figure 6A:
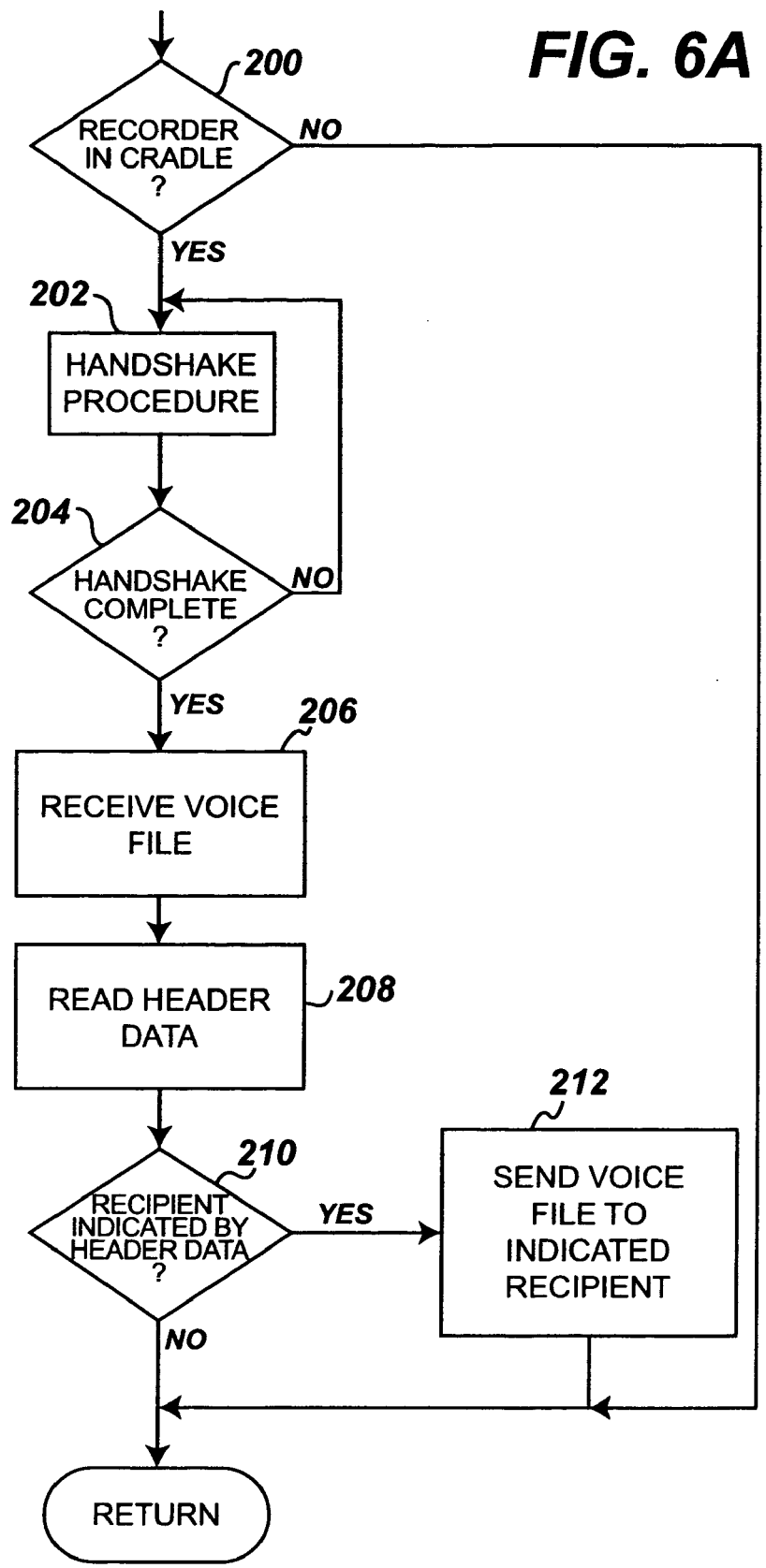
FIG. 6A is a flow chart which illustrates a software routine for controlling, in accordance with the invention a personal computer shown in FIG. 1.

FIG. 6A is a flow chart which illustrates software that controls the PC 16 in connection with its handling of the voice data file uploaded at step 154 in FIG. 5. Continuing to refer to FIG. 6A, step 200 is illustrated first. At step 200, it is determined whether the recorder has been placed in the cradle connected to the PC. If not, control of the PC returns to other software processes maintained in the PC. However, if at step 200 it is determined that the recorder has been placed in the cradle, then step 202 follows. Step 202 represents a handshake procedure which is carried out in connection with the establishment of the data communication interface referred to at step 152 in FIG. 5. Step 204 indicates that the handshake procedure continues until completion. Upon completion of the handshake procedure, step 206 is carried out. At step 206 the PC receives the voice data file referred to in connection with FIG. 5, including at least some of the header data illustrated in FIG. 4A.

Step 208 follows step 206. At step 208, the PC reads at least some of the header data uploaded with the voice data file, including one or more header data elements relevant to a determination as to whether the uploaded voice data file is to be automatically forwarded to a device which is connected to the PC 16 via the LAN 24 (FIG. 1).

Still referring to FIG. 6A, decision block 210 follows step 208. At step 210, it is determined whether the header data read at step 208 indicates that the voice data file received at step 206 is to be automatically forwarded to one of the aforesaid other devices connected to the PC. As an example, the PC may have been pre-programmed such that every voice data file having header data that indicates a particular individual as the author of the file should be automatically forwarded via LAN 24 to the central dictation system (reference numeral 28 in FIG. 1). As another example, the pre-programming of the PC may call for all voice data files authored by the given individual to be automatically forwarded via LAN 24 to another PC which is utilized by a transcriptionist who has been assigned to the author.

As still another alternative, the recorder unit identification data included in the header data may be used as a surrogate for the author's name, leading to automatic forwarding of the voice data file to the central dictation system or the transcriptionist's PC, as the case may be. As other alternatives, a client name reference and/or the word "letter" or "dictation" in the title data element 116 or in a "work type" field (not shown) in the header data (FIG. 4A) would be indicative of a destination (such as the central dictation system or the transcriptionist's PC) to which the voice data file is to be forwarded.

The header data may also include a "location" field (not shown) which identifies a particular work location or professional establishment to which the voice file pertains. The location field could also be used by the PC to determine a destination to which the voice file is to be forwarded.

To provide yet another example, the type data element 108 (FIG. 4A), or another field in the header data may indicate that the uploaded voice data file is an outgoing voice mail message which is to be forwarded to the voice mail system 26 shown in FIG. 1.

If a positive determination is made at step 210, then step 212 follows, at which the voice data file is sent to the device indicated as the appropriate recipient by the relevant header data. Otherwise, the routine of FIG. 6A terminates without forwarding the voice data file from the PC to another device.

In the examples of automatic forwarding of voice data files that have been provided up to this point, it has been assumed that the header data used to indicate the destination of the voice data file has either been generated automatically by the recorder unit or was input by the user for the purpose of identifying the voice data file or for another purpose not necessarily related to designating the destination of the voice data file. However, according to another aspect of the invention, the user of the recorder is enabled to dictate into the recorder information which indicates a destination to which a voice data file is to be forwarded after uploading to the PC 16. Examples of this aspect of the invention will now be described with reference initially to FIG. 7A.

Figure 7A:
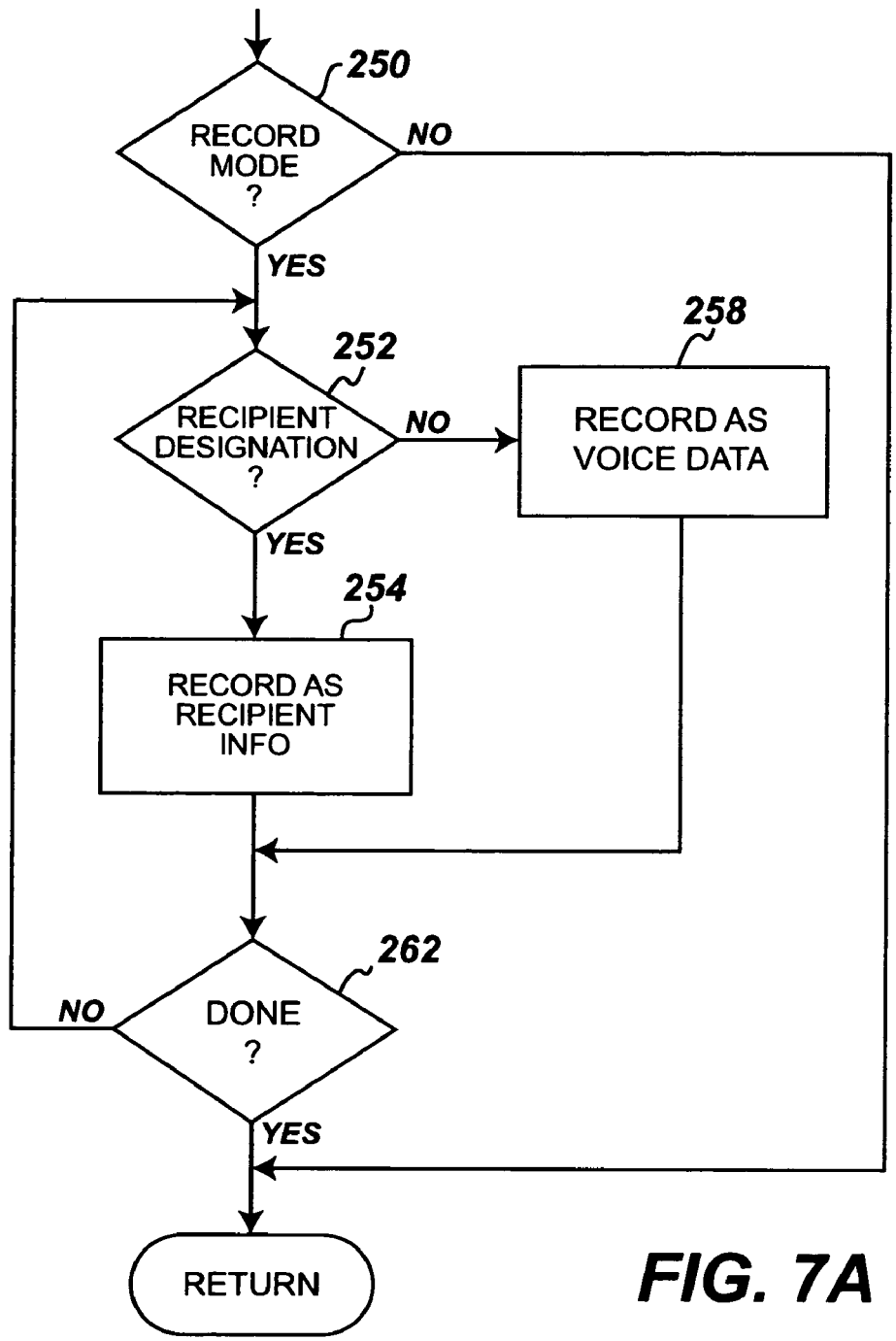
FIG. 7A is a flow chart which illustrates details of a "create voice file" block of FIG. 5.

FIG. 7A is indicative of software which controls the recorder 12 in accordance with this aspect of the invention.

In particular, FIG. 7A may be considered to represent an alternative version of the step 150 previously described in connection with FIG. 5.

Initially in FIG. 7A is a step 250, at which it is determined whether the recorder has been placed into a recording mode. From previous discussion it will be understood that the recording mode may be entered by actuating the recorder slide switch 34 or, perhaps, by selecting an option made available through the touch screen 32. If the recording mode is entered, then step 252 follows, at which it is determined whether a sub-mode is to be entered in which a destination for the voice data file is to be dictated. To enter the sub-mode for designating a destination, a dedicated push button (not shown) may be provided on the recorder 12. Alternatively, such a sub-mode may be accessible via the touch screen 32. In any event, if the destination designation sub-mode is actuated, then step 254 follows step 252. At step 254, voice information dictated into the recorder microphone during the sub-mode is recorded as "recipient information" and is stored separately (as indicated at 256 in FIG. 4B) from the body of the voice data file.

Figure 4B:
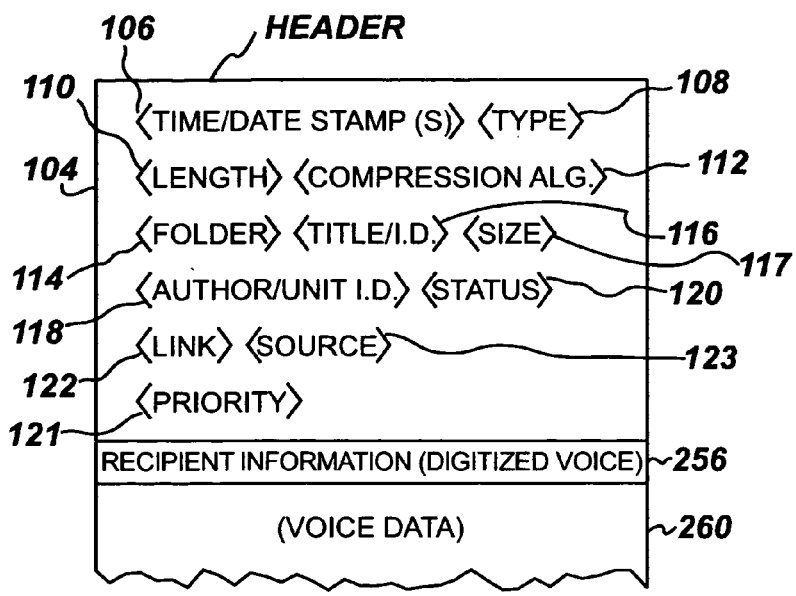
FIGS. 4B and 4C show alternative voice file formats.

Block 258 in FIG. 7A indicates that voice information dictated into the recorder during recording mode, when the recipient information sub-mode is not actuated, is simply recorded as voice data to be stored in the body of the voice data file, as indicated at 260 in FIG. 4B. Decision block 262 in FIG. 7A represents a determination as to whether the user of the recorder has decided to exit the recording mode.

Figure 6B:
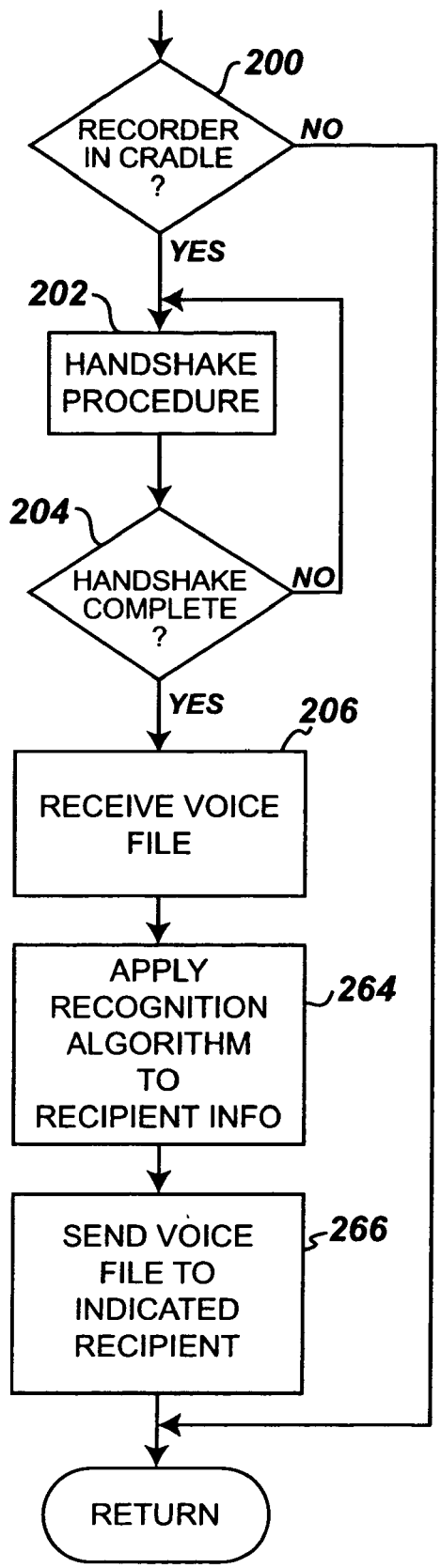
FIG. 6B is a flow chart which illustrates an alternative software routine provided according to the invention for controlling the personal computer.

FIG. 6B illustrates a software routine carried out in the PC 16 to handle a voice data file in the format of FIG. 4B which has been uploaded to the PC from the recorder unit. It will be noted that FIG. 6B includes the same process steps 200, 202, 204 and 206 as in FIG. 6A, and those steps may be carried out in the same manner, except that step 206 in FIG. 6B need not include reading of the header data of the uploaded voice data file. In the routine of FIG. 6B, step 264 follows step 206. At step 264 the PC applies a speech recognition algorithm to the recipient information 256 shown in FIG. 4B to identify words or other information that was dictated by the user of the recorder to identify the desired destination for the voice data file. It will be understood that the PC is suitably programmed to recognize and respond appropriately to utterances such as "secretary", "secretary one", "secretary two", "send to JJD", "send to JJD with a copy to DKG", "voice mailbox no. 682", and so forth. It is to be understood that the appropriate response to recognition of the first four utterances listed above may be to forward the voice data file to a particular personal computer to which the PC 16 is connected by the LAN 24. In response to the fifth of the listed utterances, the PC 16 would send the voice data file to each of two different personal computers to which PC 16 is connected by the LAN 24. A suitable response to the last of the listed utterances would be to forward the voice data file, perhaps with suitable addressing information, to the voice mail system 26 (FIG. 1).

Referring again to FIG. 6B, it will be understood that block 266 represents routing of the voice data file by the PC 16 in accordance with the result of the application of the recognition algorithm.

The voice data file routing technique represented collectively by FIGS. 7A, 6B and 4B provides for machine recognition of spoken information to be carried out in the personal computer 16. But according to an alternative aspect of the invention, the speech recognition function may be performed in the portable recorder 12 before the voice data file is uploaded to the PC 16. A technique according to the latter aspect of the invention is illustrated in FIGS. 7B, and 4C.

Figure 7B:
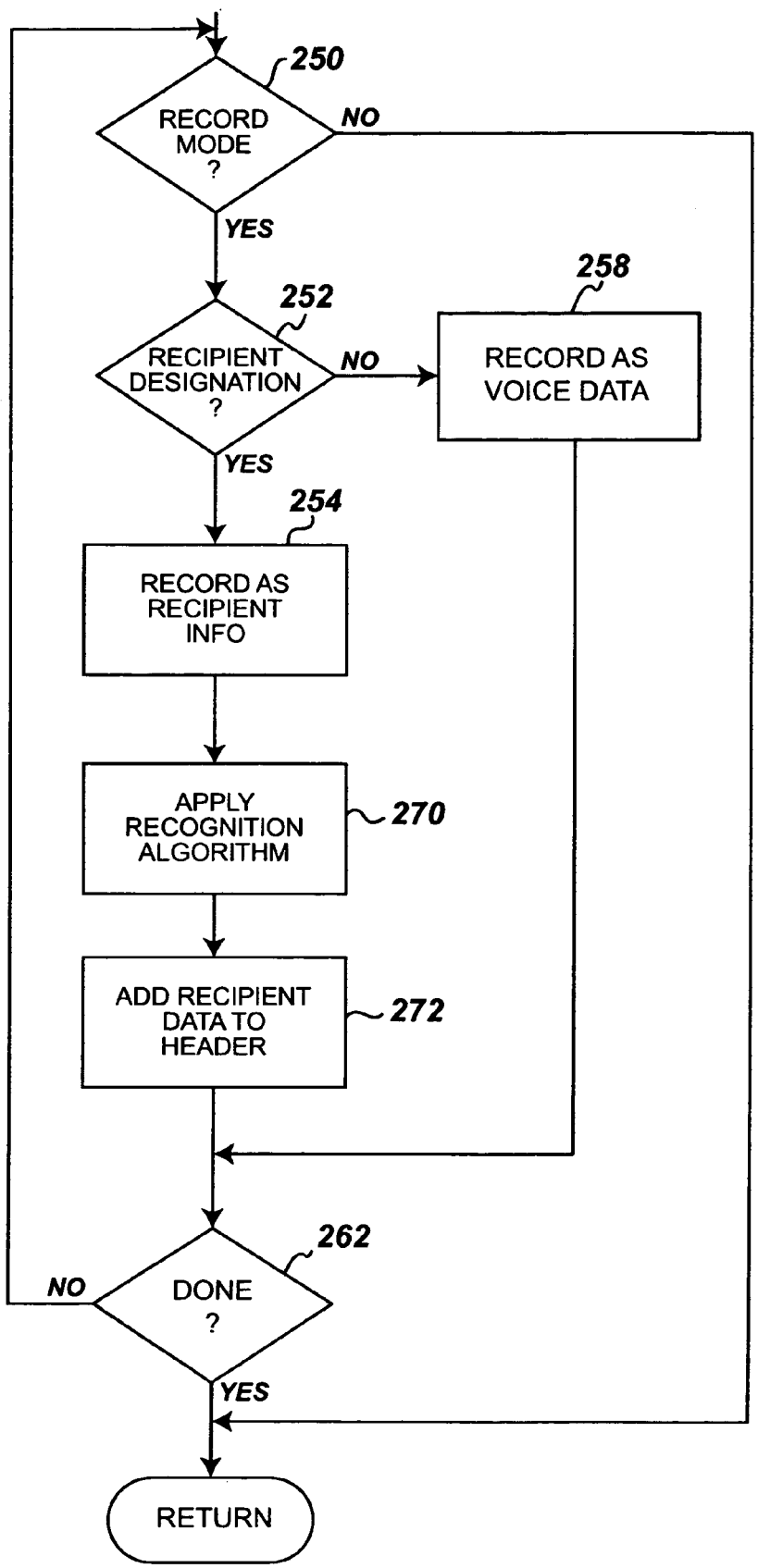
FIG. 7B is a flow chart which illustrates an alternative to the procedure of FIG. 7A.

FIG. 7B is a flow chart representation of software which controls operation of the recorder 12 in connection with creation of a voice data file. It will be recognized that the procedure illustrated in FIG. 7B is an alternative to the procedure of FIG. 7A, and includes the same steps 250, 252, 254, 258 and 262 as are shown in FIG. 7A. However, the execution of step 254 shown in FIG. 7B (recording of voice data as "recipient information") may be performed so that the recipient information voice data is stored in a buffer memory or otherwise separately from the pertinent voice data file. Consequently, step 254, as carried out in the procedure of FIG. 7B, need not result in storage of the "recipient information" 256 shown in FIG. 4B as part of the voice data file format.

In any event, according to the procedure of FIG. 7B, a step 270 is shown as following step 254. At step 270, a speech recognition algorithm is applied by the recorder 12 to the recorded recipient information voice data to recognize the content of the voice data, such as words, numbers and/or letters. The resulting text character information is then added to the header data for the subject voice data file (as indicated at step 272 in FIG. 7B), to provide the "recipient" element of the header data indicated at 274 in FIG. 4C. The resulting voice data can then be uploaded and handled by the personal computer 16 in accordance with the process of FIG. 6A, which has previously been discussed. To elaborate, at step 208 of the procedure of FIG. 6A, the PC 16 reads the recipient data 274 (FIG. 4C), and then at step 212 the PC 16 forwards the voice data file to the recipient indicated by the recipient data.

Figure 4C:
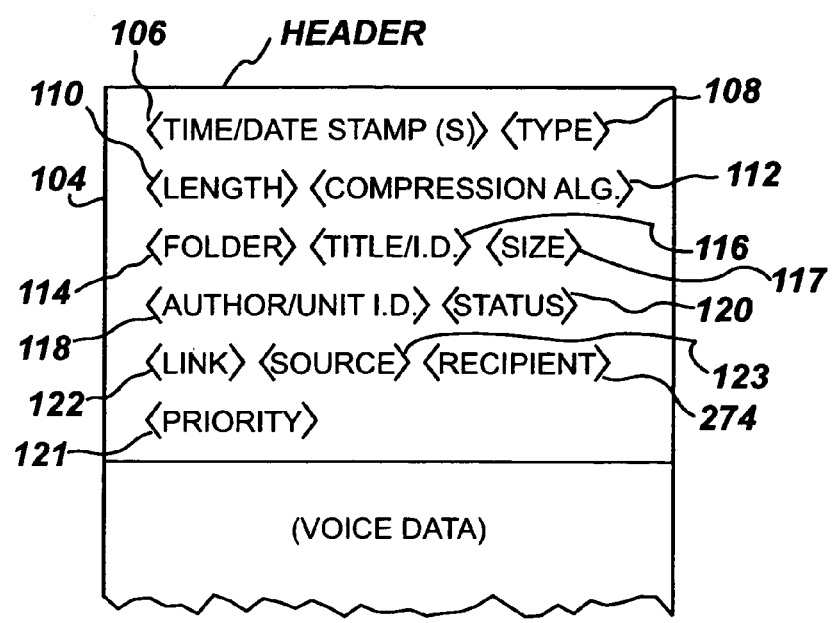

It should also be understood that a voice data file format like that shown in FIG. 4C, and including a recipient data element 274, may be implemented in the recorder 12 without employing speech recognition processing. Thus, for example, the user of the recorder may be permitted to enter recipient data in the form of alphanumeric characters via a virtual keyboard provided through the touch screen 32 of the recorder. Recipient information could also be selected by the user from an address book/telephone number data base maintained in the recorder unit. The data in the database may, in turn, have been downloaded to the recorder unit from a PC, or may have been entered via touch screen 32.

Although the voice data management system portrayed in FIG. 1 includes three or more PC's, a central dictation system, a voice mail system, and a server, it should be understood that many of these system components may be omitted. A minimal implementation of the present invention might be constituted by the recorder 12, the PC 16, and one other device connected by a data communication link with the PC 16. Of course, system components may exchange data files of other types in addition to voice data files.

It should be noted that the hardware and data communication environment illustrated and described in connection with FIGS. 1–3 may be changed in a number of other respects without departing from the invention. For example, among other changes which may be made in the recorder 12, the touch screen 32 may be omitted in favor of a one or two line character display (not shown). In such a case, additional switches, which may include software-programmable keys, may be added to provide aspects of the user interface. The switches may include a thumbwheel switch to be used for scrolling among menu items. The recorder may also include a key pad and/or a bar code reader. These items may be permanently installed as part of the recorder, or may be provided as one or more optional snap-on modules. The key pad and bar code reader may be employed to enter header data and for other purposes.

In addition to or instead of the cradle-based data link between the recorder 12 and the PC 16, data communication may be established between the recorder and the PC by a wireless RF link and/or infrared data communication. One type of communication that may be used is the well-known IRDA technique. Moreover, the cradle referred to above may be changed to permit serial (e.g. RS-232 or USB) data communication or IR data communication between the PC and the recorder.

It should also be understood that the data communication between the PC 16 and other components of the voice data management system 10 (FIG. 1) may be implemented by connections other than or in addition to the local area network 24 referred to above. Thus, one or more of dial-up telephone data lines, dedicated telephone data channels, a wide area network, and/or wireless data communication may be provided to interconnect system components. The constituents of the voice data management system may be more or fewer in number than those shown in FIG. 1. For example, more than one central dictation system may be connected to the PC 16.

In the foregoing discussion, it has been assumed that all of the header data has been generated or input at the recorder unit. However, it is also contemplated that some of the header data (including header data to be subsequently used for automatic routing) may be downloaded to the recorder unit from the PC 16.

It is to be understood that the above description may indicate to those skilled in the art additional ways in which the principles of this invention may be used without departing from the spirit of the invention. The particularly preferred methods and apparatus are thus intended in an illustrative and not limiting sense. The true spirit and scope of the invention are set forth in the following claims.

What is claimed is:

1. A voice data management system, comprising:
   a portable digital audio recorder which includes memory means for storing a plurality of voice data files;
   header data associated with each of said voice data files stored in said memory means, said header data automatically generated by said portable digital audio recorder;
   a personal computer;
   means for transferring one of said voice data files and the corresponding header data from the portable recorder to the personal computer;
   an information processing device other than said portable recorder and said personal computer; and
   means, interconnecting said personal computer with said information processing device, for permitting transmission of data from said personal computer to said other information processing device;
   wherein said personal computer reads said header data transferred to the personal computer and uses said header data to determine whether to transfer the corresponding voice data file to said other information processing device;
   wherein said header data that is used to determine whether to transfer the corresponding voice data file to said other information processing device is indicative of one of (a) an identity of said portable digital audio recorder; (b) a subject matter of the voice data file corresponding to said header data; and (c) a work type of the voice data file corresponding to said header data.

2. A voice data management system according to claim 1, wherein said other information processing device is another personal computer.

3. A voice data management system according to claim 1, wherein said other information processing device is a voice mail system.

4. A voice data management system according to claim 1, wherein said header data that is used to determine whether to transfer the corresponding voice data file to said other information processing device is indicative of an identity of said portable digital audio recorder.

5. A voice data management system according to claim 1, wherein said header data that is used to determine whether to transfer the corresponding voice data file to said other information processing device is indicative of a subject matter of the voice data file corresponding to said header data.

6. A voice data management system according to claim 1, wherein said header data that is used to determine whether to transfer the corresponding voice data file to said other information processing device is indicative of a work type of the voice data file corresponding to said header data.

7. A voice data management system according to claim 1, wherein said portable audio recorder automatically generates said header data based on information manually added to said portable audio recorder.

8. A voice data management system, comprising:
   a portable digital audio recorder which includes memory means for storing a plurality of voice data files, said memory means storing corresponding header data in association with each of the stored data files;
   a personal computer;
   means for transferring one of said voice data files and the corresponding header data from the portable recorder to the personal computer;
   a central dictation system; and
   means, interconnecting said personal computer with said central dictation system, for permitting transmission of data from said personal computer to said central dictation system;
   wherein said personal computer reads said header data transferred to the personal computer, and on the basis of said header data, determines whether to transfer the corresponding voice data file to said central dictation system.

9. A method of operating a voice data management system, comprising the steps of:
   generating a voice data file in a portable digital audio recorder, said file including voice data and header data, said header data automatically generated by said portable digital audio recorder;
   transferring said voice data file from said recorder to a personal computer;
   reading the header data in said transferred voice data file; and
   using the header data to determine whether to transfer said voice data from said personal computer to an information processing device;
   wherein said header data that is used to determine whether to transfer the voice data to said information processing device is indicative of one of (a) an identity of said portable digital audio recorder; (b) a subject matter of the voice data file; and (c) a work type of the voice data file.

10. A method according to claim 9, wherein the information processing device is another personal computer.

11. A method according to claim 9, wherein the information processing device is a voice mail system.

12. A method of operating a voice data management system, comprising the steps of:
   generating a voice data file in a portable digital audio recorder, said file including voice data and header data;
   transferring said voice data file from said recorder to a personal computer;

reading the header data in said transferred voice data file; and on the basis of the header data that has been read, determining whether to transfer said voice data from said personal computer to a central dictation system.

13. A voice data management system, comprising:
a portable digital audio recorder which includes memory means for storing a plurality of voice data files;
header data associated with each of said voice data files stored in said memory means, said header data automatically generated by said portable digital audio recorder;
a personal computer;
means for transferring said voice data files and the corresponding header data from the portable recorder to the personal computer;
a plurality of information processing devices other than said portable recorder and said personal computer; and
means, interconnecting said personal computer with said plurality of information processing devices, for permitting transmission of data from said personal computer to a selected one of said plurality of data processing devices;
wherein said personal computer reads said header data transferred to the personal computer, and on the basis of said header data, selects one of said plurality of information processing devices to receive a voice data file corresponding to said header data and transmits the corresponding voice data file to the selected data processing device, and wherein one of said plurality of information processing devices selected by said personal computer is a voice mail system.

14. A voice data management system according to claim 13, wherein said header data read by said personal computer includes data which identifies said portable digital audio recorder.

15. A voice data management system according to claim 13, wherein said header data read by said personal computer includes data which identifies an intended recipient for the voice data file corresponding to said header data.

16. A voice data management system according to claim 13, wherein said header data read by said personal computer includes data which identifies a subject matter of the voice data file corresponding to said header data.

17. A voice data management system according to claim 13, wherein said one of said plurality of information processing devices selected by said personal computer is another personal computer.

18. A voice data management system according to claim 13, wherein said one of said plurality of information processing devices selected by said personal computer is a central dictation system.

19. A method of operating a voice data management system, comprising the steps of:
generating a voice data file in a portable digital audio recorder, said file including voice data and header data, said header data automatically generated by said portable digital audio recorder;
transferring said voice data file from said recorder to a personal computer;
reading the header data in said transferred voice data file;
using the header data to select an information processing device separate from said personal computer; and
transferring said voice data from said personal computer to said selected information processing device;
wherein said header data that is used to select said information processing device is indicative of one of (a) an identity of said portable digital audio recorder; (b) a subject matter of the voice data file; and (c) a work type of the voice data file.

20. A method according to claim 19, wherein the selected information processing device is a voice mail system.

21. A method of operating a voice data management system, comprising the steps of:
generating a voice data file in a portable digital audio recorder, said file including voice data and header data;
transferring said voice data file from said recorder to a personal computer;
reading the header data in said transferred voice data file;
on the basis of the header data that has been read, selecting a central dictation system; and
transferring said voice data from said personal computer to said selected central dictation system.

22. A method of operating a voice data management system, comprising the steps of:
dictating voice information into a portable audio recorder;
storing the voice information in the portable audio recorder in the form of digital voice data;
dictating recipient information into the portable audio recorder;
applying a speech recognition algorithm to said recipient information to generate recipient data;
transferring said digital voice data from said recorder to a personal computer;
selecting a data processing device from among a plurality of data processing devices connected to said personal computer, on the basis of said recipient data; and
transferring said digital voice data from said personal computer to said selected data processing device;
wherein said speech recognition algorithm is applied to said recipient information by said portable audio recorder to generate said recipient data.

23. A method according to claim 22, further comprising the step of transferring said recipient data from said recorder to said personal computer.

24. A voice data management system, comprising:
a portable digital audio recorder which includes a microphone for inputting voice information, memory means for storing said voice information in the form of digital voice data, and means for designating a portion of said digital voice data as recipient information;
a personal computer;
a plurality of data processing devices;
means interconnecting said personal computer to said data processing devices for transmission of data from said personal computer to said data processing devices;
means for transferring digital voice data from said recorder to said personal computer; and
means for generating recipient data by applying a speech recognition algorithm to digital voice data designated as recipient information by said means for designating;
said personal computer selecting one of said data processing devices separate from said portable recorder and said personal computer on the basis of said recipient data generated by said means for generating, and said personal computer transferring to said selected data processing device digital voice data transferred from said recorder to said personal computer.

25. A voice data management system according to claim 24, wherein said means for transmission of data from said personal computer to said data processing devices includes a local area network.

* * * * *